_United States Patent Office_

3,474,169
Patented Oct. 21, 1969

3,474,169
ANTICOCCIDIAL COMPOSITIONS CONTAINING SUBSTITUTED QUINOLINE-3-CARBOXYLATES
Robert L. Clark, Woodbridge, Arthur A. Patchett, Cranford, and Edward F. Rogers, Middletown, N.J., assignors to Merck & Co., Inc., Rahway, N.J., a corporation of New Jersey
No Drawing. Continuation-in-part of application Ser. No. 515,757, Dec. 22, 1965. This application Mar. 1, 1967, Ser. No. 619,555
Int. Cl. A61k 27/00; A01n 9/22
U.S. Cl. 424—258                     9 Claims

ABSTRACT OF THE DISCLOSURE

Loweralkyl esters of 4-hydroxy-quinoline-3-carboxylic acids having at the 6- and 7-positions a loweralkyl radical of 2–4 carbons or a diloweralkylamino radical, with at least one of such substituents being diloweralkylamino, are obtained by reacting an appropriately substituted aniline with dialkyl alkoxymethylene malonate to form an anil, and heating said anil. The products are novel and have significant anticoccidial activity; for this purpose they are mixed with an element of poultry sustenance and administered to poultry.

CROSS-REFERENCE TO RELATED APPLICATIONS

This is a continuation-in-part of our pending applications Ser. Nos. 540,495 and 573,469, said latter application being a continuation-in-part of Ser. No. 572,225, now abandoned, which is in turn a continuation-in-part of Ser. No. 515,757, now abandoned.

BACKGROUND OF THE INVENTION (1) The invention pertains to compositions containing organic heterocyclic compounds which are esters of quinoline carboxylic acids, such compositions being useful in the control of coccidiosis.

(2) The compounds of this invention are novel loweralkyl-4-hydroxy-quinoline-3-carboxylates having a diloweralkylamino radical at one of the 6- and 7-positions, and a diloweralkylamino or a lower alkyl radical at the other. Such compounds are highly potent coccidiostats. The prior art discloses certain quinoline-6,7-diethers, such as 6,7-diloweralkoxy-4-hydroxy-quinoline-3-carboxylates, as having anticoccidial properties in U.S. Patents Nos. 3,267,106 and 3,290,315.

SUMMARY

An object of this invention is to provide, a new class of quinoline carboxylates. A further object is to provide a class of loweralkyl 6,7-disubstituted-4-hydroxy-quoline-3-carboxylates more potent as anticoccidial agents than those previously described. More specifically the compounds of the invention are loweralkyl-6,7-disubstituted-4-hydroxy-quinoline-3-carboxylates were the 6- and 7-position substituents are loweralkyl of 2–4 carbons or diloweralkylamino radicals, at least one being diloweralkylamino. Another object is provision of a chemical synthesis of these substances by heat-induced cyclization of the anil obtained on reaction of a 3,4-disubstituted aniline with diloweralkyl alkoxymethylene malonate. The invention relates further to anticoccidial compositions containing such substituted quinolines as an active ingredient, either alone or together with one or more other coccidiostats, and to the method of treating coccidiosis with such compositions.

DESCRIPTION OF THE INVENTION

The novel compounds of this invention may be represented by the structural formula

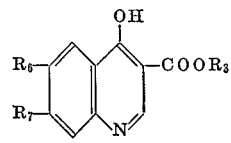

I where:
$R_3$ represents loweralkyl such as methyl, ethyl, propyl or butyl;
$R_6$ and $R_7$ each represent loweralkyl or 2–4 carbon atoms such as ethyl, n-propyl, isopropyl and n-butyl, or a diloweralkylamino radical such as dimethylamino diethylamino, di-n-propylamino, with the proviso that at least one of $R_6$ and $R_7$ must be diloweralkylamino.

The invention also contemplates the quaternary salts obtained on reaction of the quinoline I with a loweralkyl halide.

In the preferred compounds of our invention, $R_3$ is methyl or ethyl, and the substitution at the 6–7 positions is 6-n-propyl-7-diethylamino, 6-n-butyl-7-diethylamino, 6,7-diethylamino, or 6-diethylamino-7-n-propyl. It is this group of substances that possesses the greatest degree and spectrum of anticoccidial activity, although all of the substances represented by Formula I are good coccidiostats.

Representative of specific quinoline compounds within the scope fo this invention are methyl 6-n-propyl-7-diethylamino-4-hydroxy-quinoline-3-carboxylate,
ethyl 6-n-pripyl-7-diethylamino-4-hydroxy-quinoline-3-carboxylate,
methyl 6-n-butyl-7-diethylamino-4-hydroxy-quinoline-3-carboxylate,
methyl 6-n-propyl-7-dimethylamino-4-hydroxy-quinoline-3-carboxylate,
methyl 6-n-propyl-7-di-n-propylamino-4-hydroxy-quinoline-3-carboxylate,
methyl 6,7-diethylamino-4-hydroxy-quinoline-3-carboxylate,
propyl 6,7-diethylamino-4-hydroxy-quioline-3-carboxylate,
ethyl 6,7,-diethylamino-4-hydroxy-quinoline-3-carboxylate,
methyl 6-diethylamino-7-n-propyl-4-hydroxy-quinoline-3-carboxylate, and
6-dimethylamino-7-n-butyl-4-hydroxy-quinoline-3-carboxylate.

The quinolates of this invention are synthesized from a 3-$R_7$-6-$R_6$-aniline having the structural formula

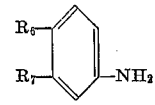

I by reacting said aniline with a diloweralkyl loweralkoxymethylene malonate of the structure $R_3OCHC(COOR_3)_2$     (III)

The immediate reaction product is the anil having the structure

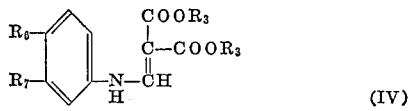

In compounds II, III and IV the symbols $R_3$, $R_6$ and $R_7$ are as previously defined in Formula I. The anil Compound IV is chemically defined as loweralkyl α-carbo-loweralkoxy-β-(3-$R_7$-4-$R_6$-anilino)-acrylate. The ester (IV) is then converted to the loweralkyl 4-hydroxy-6-$R_6$-7-$R_7$-quinoline-3-carboxylate by heating at elevated temperatures.

The reaction of the aniline (II) with the malonate ester (III) is preferably carried out in an inert solvent medium such as in a loweralkanol, e.g. methanol, ethanol or isopropanol, or an ether such as diethyl ether, dioxane, diethylene glycol, dimethyl ether or ethylene glycol. Essentially equimolar amounts of the reactant are employed although this is not essential and a molar excess of either may be used if desired. Reaction temperatures of from 40-120° C., and preferably 70-100° C., are employed for best results. When the reaction is essentially complete the solvent may be removed by known techniques, and the anil (IV) employed directly without further purification in the ring-closure reaction leading to the quinolate (I). This is effected by heating at 200-300° C., and preferably at about 240-270° C., for from about 10-30 minutes. Although not necessary, it is desirable to carry out the reaction in a high-boiling organic solvent such as dimethylsulfone, dodecylbenzene, biphenyl, diphenylether and similar solvents inert under the reaction conditions. At the end of the reaction period the mixture is cooled and the desired loweralkyl 4-hydroxy-6,7-disubstituted-quinoline-3-carboxylate recovered and purified by techniques known to those skilled in this art.

It has been found convenient to carry out the complete synthetic process without purification of the intermediate anil (IV), and in some cases without isolation of the 3-$R_7$-4-$R_6$-aniline (II). When loweralkyl 6-loweralkyl-7-dialkylamino-4-hydroxy-quinoline - 3 - carboxylates are being prepared, the aniline II is conveniently obtained by catalytic reduction of the corresponding nitrobenzene in a lower alkanol, and in such cases we prefer to simply remove the catalyst and treat the alkanolic reaction mixture containing 3-$R_7$-4-$R_6$-aniline with the alkoxymethylene malonate.

The compounds of Formula I above form quaternary salts on heating with loweralkyl halides, and such salts are contemplated by this invention. These salts are obtained by employing a molar excess of alkyl halide, and are readily purified by crystallization from solvents such as acetonitrile. The quaternary of methyl 6-n-propyl-7-diethylamino - 4 - hydroxy-quinoline-3-carboxylate and methyl iodide, named 3-carbomethoxy-4-hydroxy-6-n-propyl-7-diethylmethyl-quinolyl ammonium iodide may be pictured structurally as

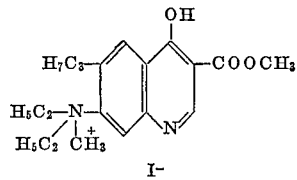

Representative examples of other quaternary salts are 3 - carboethoxy - 4 - hydroxy-6-n-propyl-7-diethylmethyl quinolyl ammonium bromide, 3-carbomethoxy-4-hydroxy-6-n-propyl-7-triethyl quinolyl ammonium iodide, 3-carbomethoxy-4-hydroxy-7-n-propyl - 6 - quinolyl-diethylmethyl ammonium iodide, and 3-carboethoxy - 4 - hydroxy-6-triethyl-7-diethylamino quinolyl ammonium chloride.

These salts are, like the parent compounds, highly active anticoccidial agents.

The novel quinoline-3-carboxylates of Formula I above may also be prepared by esterifying the corresponding quinoline-3-carboxylic acid. This process is effected by treating the free acid with a loweralkanol in the presence of a mineral acid such as hydrochloric acid, sulphuric acid, and the like. The esterification temperature should be maintained at about 75-150° C., conveniently at about 100° C. for several hours. The acid and excess alkanol may then be removed in vacuo and the residual ester (I) isolated and purified by conventional techniques such as neutralization, extraction into and crystallization from organic solvents.

The compounds of Formula I are also preparable from the corresponding quinoline-3-carboxylic acid halide by reaction of an acid halide such as the acid chloride, with a loweralkanol, e.g. methanol or ethanol, at about 40-160° C. The loweralkyl quinolate is isolated and purified by standard techniques.

The 4-hydroxy-6-$R_6$-7-$R_7$-quinoline-3-carboxylic acids, where $R_6$ and $R_7$ are as previously defined, referred to hereinabove may be obtained by heating a loweralkyl ester thereof with a base, such as an aqueous alkali metal hydroxide. The corresponding acid halides, such as 4-hydroxy-6-$R_6$-7-$R_7$-quinoline-3-carbonyl chloride or bromide, are synthesized by reacting the free acid with thionyl chloride or bromide at an elevated temperature of about 60-90° C.

Coccidiosis is a widespread poultry disease involving the invasion of caecal and intestinal mucosa by coccidia, specifically protozoan parasites of the genus Eimeria. The most important of these species are *E. maxima*, *E. ascervulina*, *E. tenella*, *E. necatrix*, *E. brunetti*, *E. praecox* and *E. mitis*. Related species of coccidia such as *E. meleagridis* and *E. adenoides* cause coccidiosis in turkeys. When left untreated, the severe forms of the disease leads to poor weight gain, reduced feed efficiency, reduced egg production and high mortality. For these reasons, the effective control of coccidiosis is highly important to the poultry industry.

It has been discovered that the loweralkyl 6-$R_6$-7-$R_7$-4-hydroxy-quinoline-3-carboxylates of Formula I above, and the quaternary salts thereof, are highly effective for the treatment and prevention of coccidiosis.

In using the compounds of this invention in the treatment and prevention of coccidiosis, they are conveniently fed to poultry as a component of the feed of the animals although they may also be given dissolved or suspended in the drinking water. According to one aspect of the invention, novel compositions are provided in which compounds of Formula I above are present as an active anticoccidial ingredient. Such compositions comprise the quinolates intimately dispersed or admixed with an inert carrier or diluent. By an inert carrier is meant one that is nonreactive with respect to the quinolate and that may be administered with safety to the animals. The carrier or diluent is preferably one that is or may be an ingredient of the animal feed and is usually itself an element of poultry sustenance.

The compositions which are a preferred feature of this aspect of the invention are the so-called feed supplements in which the active ingredient is present in relatively large amounts and which are suitable for addition to the poultry feed either directly or after an intermediate dilution or blending step. Examples of carriers or diluents suitable for such compositions are solid, orally ingestable, nutritive carriers such as distillers' dried grains, corn meal, citrus meal, fermentation residues, ground oyster shells, wheat shorts, molasses solubles, corn cob meal, edible vegetable substances, toasted dehulled soya flour, soybean mill feed, antibiotic mycelia, soya grits, crushed limestone and the like. The quinolate is intimately dispersed or admixed throughout the solid inert carrier by methods such as grinding, stirring, milling or tumbling. By selecting proper diluents and by altering the ratio of carrier to active ingredient, compositions of any desired concentration may be prepared. Formulations containing from about 1% to about 40% by weight, and preferably from about 2–25% by weight of active ingredient are particularly suitable for addition to poultry feeds, and compositions containing from about 5–15% by weight of quinolate are very satisfactory. The active compound is normally dispersed or mixed uniformly in the diluent but in some instances may be sorbed on the carrier. The optimal concentration of coccidiostat in these feed supplements will depend to some extent on the particular compound employed. Since it is convenient for the feed manufacturer to use about one pound of feed supplement for each ton of finished feed, the preferred concentration of any one of our coccidiostats in a feed supplement is partly a function of the level of active ingredient desired in the finished feed.

Examples of typical feed supplements containing a compound of this invention dispersed in a solid carrier are:

(A)

| | Lbs. |
|---|---|
| Methyl 6-n-propyl-7-diethylamino-4-hydroxy quinolate-3-carboxylate | 5.0 |
| Wheat shorts | 95.0 |

(B)

| | |
|---|---|
| Ethyl 6-diethylamino-7-n-propyl-4-hydroxy-quinoline-3-carboxylate | 10.0 |
| Soya grits | 90.0 |

(C)

| | |
|---|---|
| Methyl 6,7-diethylamino-4-hydroxy-quinoline-3-carboxylate | 15.0 |
| Corn distillers' dried grains | 85.0 |

(D)

| | |
|---|---|
| Methyl 6-n-propyl-7-diethylamino-4-hydroxy quinoline-3-carboxylate | 5.0 |
| Amprolium | 20.0 |
| Wheat standard middlings | 75.0 |

These and similar feed supplements are prepared by uniformly mixing the quinolate with the carrier or carriers.

The feed supplements of the type illustrated hereinabove are usually further diluted with materials such as corn meal or soybean meal before being incorporated in the animal feed. In this intermediate processing step the level of coccidiostat in the carrier is brought down to from about 0.1% to about 1.0% by weight. This dilution serves to facilitate uniform distribution of the substance in the finished feed. The finished feed is one that contains a source of fat, protein, carbohydrate, minerals, vitamins and other nutritional factors.

The amount of loweralkyl 6-$R_6$-7-$R_7$-4-hydroxy-quinoline-3-carboxylate (where $R_6$ and $R_7$ are as previously defined) required for effective control of coccidiosis will depend upon factors such as the specific compound employed, the type and severity of infection, and duration of treatment. In any event, only a minor amount is necessary in relation to the total feed or drinking water consumption. Good prophylactic results are achieved when the feed administered to poultry contains from about 0.0005% to about 0.05% by weight of our quinolate compounds, and preferably from about 0.00075% to about 0.0125% by weight. With the preferred compounds of the invention excellent results are achieved at dose levels in the lower end of this range. For therapeutic use, higher levels of up to 0.1% by weight of feed may be used effectively for short periods of time.

Administration via the drinking water of the birds is often employed in the therapeutic use of our compounds since poultry with coccidiosis are apt to consume less solid feed than normal birds. The compounds may be added directly to the drinking water. Alternatively, water-soluble powders may be prepared, in which the coccidiostat is intimately admixed with a suitable carrier, such as dextrose or sucrose, and these powders added to the drinking water of poultry as necessary. Such water-soluble powders may contain any desired concentration of coccidiostat, and preparations containing from 1–25% by weight of actvie compound are suitable.

Our loweralkyl 6-$R_6$-7-$R_7$-4-hydroxy-quinoline-3-carboxylates are active against the important species of coccidia. Their potency against *E. tenella* and *E. brunetti* is of particular significance inasmuch as these lead to serious forms of infection.

According to an additional aspect of our invention, there are provided anticoccidial compositions containing a quinolate of Formula I above together with a second coccidiostat such as amprolium, zoalene, nicarbazin and the like. There is evidence that compositions containing both a quinolate and amprolium afford better control of coccidiosis than is obtainable with either substance alone. Thus, poultry feed compositions containing from about 0.001–0.005% by weight of methyl (or ethyl)-6-n-propyl-7-diethylamino - 4 - hydroxy-quinoline-3-carboxylate and from about 0.005–0.015% by weight of amprolium afford excellent control of coccidiosis in poultry. Our feed compositions may also contain other substances useful for poultry well-being such as vitamins, antibiotics or growth promotants.

The anticoccidial activity of the loweralkyl 6-$R_6$-7-$R_7$-4-hydroxy-quinoline-3-carboxylates is determined by feeding groups of straight run White Leghorn chicks a ration containing graded concentrations of quinolate compound and orally inoculating the birds with sporulated oocysts of the coccidia on the second day of the test. With *E. tenella* 50,000 oocysts are used, and with *E. brunetti*, *E. maxima* and *E. acervulina* 100,000 oocysts are employed. The birds are fed the medicated diet for a period of days (5–8), then weighed and sacrificed, and examined for remaining oocysts and/or lesions due to coccidiosis. (Details of these assays appear in U.S. Patents Nos. 3,020,200 for *E. tenella* and 3,211,610 for *E. brunetti* and other species.) The activity of the quinolate is expressed in terms of the weight percent concentration in the feed that provides the desired control of the infection. As previously stated, our compounds have significant activity at feed concentration levels of about 0.0005 to about 0.05% by weight, the precise optimum level depending on severity and type of infection.

The anticoccidial activity of representative compounds of this invention against *E. tenella* and *E. brunetti* is as follows:

| Compound | | | Dose Level (percent by weight in feed) | |
|---|---|---|---|---|
| $R_3$ | $R_6$ | $R_7$ | *E. brunetti* | *E. tenella* |
| $CH_3$ | n-$C_3H_7$ | $N(C_2H_5)_2$ | 0.0015 | 0.003 |
| $C_2H_5$ | n-$C_3H_7$ | $N(C_2H_5)_2$ | 0.0015 | 0.003 |
| $CH_3$ | n-$C_4H_9$ | $N(C_2H_5)_2$ | 0.0015 | 0.003 |
| $CH_3$ | i-$C_3H_7$ | $N(C_2H_5)_2$ | 0.003 | 0.006 |
| $C_2H_5$ | n-$C_4H_9$ | $N(C_2H_5)_2$ | 0.003 | 0.0125 |
| $CH_3$ | $N(C_2H_5)_2$ | n-$C_3H_7$ | 0.0015 | 0.003 |
| $C_2H_5$ | $N(CH_3)_2$ | n-$C_3H_7$ | 0.006 | 0.0125 |
| $CH_3$ | $N(CH_3)_2$ | n-$C_3H_7$ | 0.006 | 0.0125 |
| $CH_3$ | $N(C_2H_5)_2$ | $N(C_2H_5)_2$ | 0.0015 | 0.003 |
| $C_2H_5$ | $N(C_2H_5)_2$ | $N(C_2H_5)_2$ | 0.003 | 0.0015 |
| $CH_3$ | $N(CH_3)_2$ | $N(C_2H_5)_2$ | 0.003 | 0.0125 |

The assay procedure is found in Example 8 of Patent 3,020,200 and Example 2 of 3,211,610.

In other experiments, the anticoccidial activity is determined by the procedure of Example 4 of Patent 3,211,-

610. Methyl 6-n-propyl-7-diethylamino-4-hydroxy-quinoline-3-carboxylate has the activity set forth below.

| Concentration in feed | No. chicks | Percent mortality | Percent weight gain | Million of oocysts in surviving birds |
|---|---|---|---|---|
| *E. tenella:* | | | | |
| 0.00075 | 20 | 10 | 79 | 8.2 |
| 0.0015 | 20 | 0 | 105 | 6.0 |
| 0.003 | 20 | 0 | 96 | 3.2 |
| 0.006 | 20 | 0 | 107 | <0.1 |
| Infected control | 120 | 57 | 48 | 20.0 |
| Normal control | 40 | 0 | 100 | <0.1 |
| *E. maxima:* | | | | |
| 0.00075 | 20 | 0 | 78 | 1.6 |
| 0.0015 | 20 | 0 | 85 | 0.2 |
| 0.003 | 20 | 0 | 93 | 0.2 |
| 0.006 | 20 | 0 | 105 | <0.1 |
| Infected control | 120 | 0 | 73 | 5.3 |
| Normal control | 40 | 0 | 94 | <0.1 |
| *E. brunetti:* | | | | |
| 0.0004 | 10 | 10 | 83 | 3.4 |
| 0.00075 | 10 | 0 | 88 | 3.7 |
| 0.0015 | 10 | 0 | 104 | <0.1 |
| 0.003 | 10 | 0 | 107 | <0.1 |
| Infected control | 60 | 8 | 43 | 18.7 |
| Normal control | 20 | 0 | 109 | <0.1 |

The following examples are given for the purpose of illustration and not by way of limitation.

Example 1.—Methyl 6-n-propyl-7-diethylamino-4-hydroxy-quinoline-3-carboxylate 52.3 g. of 2-n-propyl-5-nitro-N,N-diethyl aniline in 500 ml. of methanol is hydrogenated in the presence of 3.5 g. of 5% palladium on carbon catalyst at room temperature and under a positive hydrogen pressure of about 40 p.s.i. When the theoretical amount of hydrogen is adsorbed, the hydrogenation is stopped and the catalyst removed by filtration. The filtrate is concentrated under reduced pressure to an oil consisting predominantly of 2-n-propyl-5-amino-N,N-diethyl aniline, which product is used directly in the next step without further purification.

To 48.7 g. of the oil obtained as described immediately above there is added 43.5 g. of dimethyl methoxymethylene malonate in 1 liter of toluene. The resulting mixture is refluxed for 2 hours and then concentrated under reduced pressure to remove the toluene to afford a residue of 86 g. of the anil methyl α-carbomethoxy-β-(3-diethylamino-4-n-propyl-anilino)-acrylate. This substance is used as is without further purification.

1500 ml. of dodecyl benzene is heated to 250–260° C. with stirring and 86 g. of the anil is added over a period of about 5 minutes. The resulting solution is stirred at 250–260° C. for 15–20 minutes and then allowed to cool, with stirring, to room temperature. The resulting solid is collected by filtration, washed with acetone at room temperature and dried to afford substantially pure methyl 6-n-propyl-7-diethylamino-4-hydroxy-quinoline-3-carboxylate, M.P. 198–204° C. This product is dissolved in 3 volumes of dimethylformamide, treated with activated carbon, filtered and the filtrate chilled to 0–5° C. The product crystallizes and is recovered by filtration, M.P. 212° C.

A second crop is obtained by reheating the dodecyl benzene filtrate at 250–260° C. for 15 minutes, cooling it to room temperature, and adding 400 ml. of acetone. The resulting solid methyl 6-n-propyl-7-diethylamino-4-hydroxy quinoline-3-carboxylate is recovered and purified in the same manner as stated above.

Example 2.—Ethyl 6-n-propyl-7-diethylamino-4-hydroxy-quinoline-3-carboxylate 7.8 g. of diethyl ethoxymethylene malonate in 200 ml. of toluene is added to 7.5 g. of 4-n-propyl-3-diethylamino aniline (alternatively defined as 2-n-propyl-5-amino-N,N-diethyl aniline). The resulting mixture is refluxed for 2 hours and then concentrated to dryness in vacuo to remove the solvent and the alcohol formed as a reaction product. The resulting residue consisting of ethyl α-carboethoxy-β- (3-di-ethylamino-4-n-propyl-anilino)-acrylate is added to 400 ml. of rapidly stirred dodecyl benzene at 250–260° C. The mixture is held at this temperature for 15 minutes and then allowed to cool to room temperature. The resulting solid is removed by filtration and washed with acetone to give 5 g. of ethyl 6-n-propyl-7-diethylamino-4-hydroxy-quinoline-3-carboxylate, M.P. 204–206° C.

When the above process is repeated using 4-n-propyl-3-dimethylamino aniline as starting material there is obtained ethyl 6-n-propyl-7-dimethylamino-4-hydroxy-quinoline-3-carboxylate.

Example 3.—Methyl 6-isobutyl-7-diethylamino-4-hydroxy-quinoline-3-carboxylate 10 g. of 2-isobutyl-5-nitro-N,N-diethyl aniline in 100 ml. of methanol are hydrogenated at room temperature over 0.7 g. of palladium-carbon catalyst under a positive hydrogen pressure of about 40 p.s.i. until the theoretical amount of hydrogen is absorbed. The catalyst is then removed by filtration and the mixture concentrated in vacuo to an oil of 4-isobutyl-3-diethylamino aniline. To this oil there is added 8 g. of dimethyl methoxymethylene malonate in 200 ml. of toluene. The resulting mixture is refluxed for 90 minutes and then concentrated to dryness in vacuo to afford a residue of methyl α-carbomethyloxy-β-(3-diethylamino-4-isobutyl-anilino)-acrylate.

This latter substance is added directly to 300 ml. of dodecyl benzene at 250–260° C. The mixture is stirred at that temperature for 20 minutes. It is then cooled to room temperature and the resulting solid removed by filtration, washed with acetone and dried to afford methyl 6-isobutyl-7-diethylamino-4-hydroxy-quinoline-3-carboxylate, M.P. 206–208° C.

Example 4.—Methyl 6-sec-butyl-7-diethylamino-4-hydroxy-quinoline-3-carboxylate

When the process of Example 3 is repeated employing as starting material 2-sec-butyl-5-nitro-N,N-diethyl aniline, there is obtained methyl 6-sec-butyl-7-diethylamino-4-hydroxy-quinoline-3-carboxylate, M.P. 239–243° C.

Example 5.—(A) Methyl 6-n-butyl-7-diethylamino-4-hydroxy-quinoline-3-carboxylate 32 g. of 2-n-butyl-5-nitro-N,N-diethyl aniline in 300 ml. of methanol are hydrogenated at room temperature using 2 g. of 5% palladium-on-carbon catalyst and under about 40 p.s.i. of hydrogen pressure. The hydrogenation is allowed to proceed until the theoretical amount of hydrogen is absorbed, and at the end of this time the catalyst is filtered off. The filtrate is concentrated to dryness to afford 30 g. of an oil consisting predominantly of 2-n-butyl-5-amino-N,N-diethyl aniline. This material is divided into two equal portions, one being used in the remainder of this experiment and the other in the experiment described in part B following.

To 15 g. of the foregoing product there is added 15 g. of dimethyl methoxymethylene malonate in 300 ml. of toluene. This mixture is refluxed for 2½ hours and the toluene then removed by concentration in vacuo. The residual anil is not purified further but is added directly to 500 ml. of dodecyl benzene at 250–260° C. The mixture is stirred at this temperature for 30 minutes and then cooled slowly to room temperature. The solid product is separated by filtration, washed with acetone and dried to afford 5.6 g. of methyl 6-n-butyl-7-diethylamino-4-hydroxy-quinoline-3-carboxylate, M.P. 200–205° C.

(B) Ethyl 6-n-butyl-7-diethylamino-4-hydroxy-quinoline-3-carboxylate 15 g. of the aniline derivative obtained above is reacted with diethyl ethoxymethylene malonate and the resulting anil heated in dodecyl benzene as previously described to afford 9.3 g. of ethyl 6-n-butyl-7-diethylamino-4-hydroxy-quinoline-3-carboxylate, M.P. 198–200° C.

Example 6.—Methyl 6-isopropyl-7-diethylamino-4-hydroxy-quinoline-3-carboxylate 26 g. of 2-isopropyl-5-nitro-N,N-diethyl aniline are hydrogenated to 2-isopropyl-5-amino-N,N-diethyl aniline, this latter material reacted with 22 g. of dimethyl methoxymethylene malonate in 500 ml. of toluene, and the resulting anil heated in 700 ml. of dodecyl benzene, following the procedure of Example 1, to afford 12.3 g. of methyl 6-isopropyl-7-diethylamino-4-hydroxy-quinoline-3-carboxylate, M.P. 246–253° C.

When this procedure is repeated employing 2-isopropyl-5-nitro-N,N-dimethyl aniline and diethyl ethoxymethylene malonate, there is obtained ethyl 6-isopropyl-7-dimethyl-amino-4-hydroxy-quinoline-3-carboxylate.

Example 7.—(A) Methyl 6-ethyl-7-diethylamino-4-hydroxy-quinoline-3-carboxylate 44.4 g. of 2-ethyl-5-nitro-N,N-diethyl aniline in 400 ml. of methanol is hydrogenated at room temperature using 2 teaspoons of Raney nickel catalyst under about 40 p.s.i. of hydrogen pressure. When hydrogen uptake is complete, the catalyst is filtered off and the solution divided into two equal portions. To one portion there is added 17.4 g. of dimethyl methoxymethylene malonate, and the mixture heated for one hour on a steam bath. The reaction mixture is then evaporated to an oil in vacuo, which oil consists predominantly of the anil methyl α-carbomethoxy-β-(3-diethylamino-4-ethyl-anilino)-acrylate. This material is added directly to 500 ml. of dodecyl benzene and the mixture heated at 255° C. for 30 minutes. The resulting solid is collected by filtration and recrystallized from dimethyl formamide to afford substantially pure methyl 6-ethyl-7-diethylamino-4-hydroxy-quinoline-3-carboxylate, M.P. 244° C.

(B) Ethyl 6-ethyl-7-diethylamino-4-hydroxy-quinoline-3-carboxylate

To the other half of the methanolic solution obtained above there is added 21.6 g. of diethyl ethoxymethylene malonate. This reaction mixture is treated as described above to afford ethyl 6-ethyl-7-diethylamino-4-hydroxy-quinoline-3-carboxylate, M.P. 251° C.

Example. 8.—Methyl 6-diethylamino-7-n-propyl-4-hydroxy-quinoline-3-carboxylate 5 g. of dimethyl methoxymethylene malonate is added to 5.7 g. of 3-n-propyl-4-diethylamino aniline. The resulting mixture is heated on a steam bath for 15 hours to produce the anil methyl α-carbomethoxy-β-(3-n-propyl-4-diethylamino-anilino)-acrylate as an oil. This oil is added directly to 175 ml. of dodecyl benzene at 250° C. The mixture is stirred at this temperature for 20 minutes and then cooled to room temperature. The dodecyl benzene is decanted from the dark oil which forms. The oil is triturated with acetone to afford a thin solid which is recrystallized from 3 ml. of dimethylformamide to give methyl 6-diethylamino-7-n-propyl-4-hydroxy-quinoline-3-carboxylate, M.P. 219–220° C.

When diethyl ethoxymethylene malonate is employed in the above process there is obtained ethyl 6-diethylamino-7-n-propyl-4-hydroxy-quinoline-3-carboxylate.

Example 9.—Ethyl 6-dimethylamino-7-n-propyl-4-hydroxy-quinoline-3-carboxylate 10 g. of 3-n-propyl-4-dimethylamino aniline is added to 12.7 g. of diethyl ethoxymethylene malonate in 200 ml. of toluene. The reaction mixture is refluxed for 2 hours and the solvents are then removed by concentration in vacuo. The residue of the anil is added directly to 400 ml. of dodecyl benzene which has been previously heated to 250–260° C. This temperature is maintained for 20 minutes and the mixture then cooled to room temperature. The solid product is removed by filtration and washed with acetone to yield ethyl 6-dimethylamino-7-n-propyl-4-hydroxy-quinoline-3-carboxylate, M.P. 281–283° C.

Example 10.—Methyl 6-dimethylamino-7-n-propyl-4-hydroxy-quinoline-3-carboxylate When the procedure of Example 9 is repeated using dimethyl methoxymethylene malonate, there is obtained methyl 6-dimethylamino-7-n-propyl-4-hydroxy-quinoline-3-carboxylate, M.P. 270—275° C.

Example 11.—Methyl 6-diethylamino-7-isopropyl-4-hydroxy-quinoline-3-carboxylate When the procedure of Example 8 is carried out using 5.7 g. of 3-isopropyl-4-diethylamino aniline, the amounts of the other reactants being as stated in Example 8, there is obtained methyl 6-diethylamino-7-isopropyl-4-hydroxy-quinoline-3-carboxylate.

Example 12.—Methyl 6,7-bis-dimethylamino-4-hydroxy-quinoline-3-carboxylate 12. g. of 3,4-bis-dimethylamino nitrobenzene in 100 ml. of methanol is hydrogenated at room temperature using 0.5 g. of palladium-on-charcoal catalyst under a positive hydrogen pressure. When the desired quantity of hydrogen is absorbed, the catalyst is removed by filtration and 8.5 g. of dimethyl methoxymethylene malonate are added to the methanol filtrate containing 3,4-bis-dimehylamino aniline. The resulting mixture is heated on a steam bath for 3 hours and the solvent is then removed in vacuo to leave the anil methyl α-carbomethoxy-β-(3,4-dimethylamino-anilino)-acrylate. This product is added directly to 80 ml. of dodecyl benzene at 250° C. and the mixture held at this temperature for 30 minutes. It is then cooled to room temperature and the resulting crystalline methyl 6,7-bis-dimethylamino-4-hydroxy-quinoline-3-carboxylate is recovered by filtration, M.P. 273° C.

When the above process is carried out and diethyl ethoxymethylene malonate is used in place of dimethyl methoxymethylene malonate, ethyl 6,7-bis-dimethylamino-4-hydroxy-quinoline-3-carboxylate is obtained, M.P. 275–276° C.

Example 13.—Methyl 6,7-bis-diethylamino-4-hydroxy-quinoline-3-carboxylate

A solution of 21.7 g. of 4-nitro-N,N,N',N'-tetra-ethyl-o-phenylenediamine in 200 ml. of methanol is hydrogenated using 1 teaspoonful of Raney nickel as the catalyst. The calculated hydrogen pressure drop is 72 lbs. and the observed is 61 lbs. after 2 hours at room temperature. At the end of this time the catalyst is filtered off and the filtrate is treated with 17 g. of dimethyl methoxymethylene malonate. The resulting solution is heated on a steam bath for 1 hour and the evaporated to dryness in vacuo. The residue is taken up in 125 ml. of toluene and this solution evaporated to dryness in vacuo. The residue is again taken up in 125 ml. of toluene, heated on a steam bath for 30 minutes and then evaporated to dryness in vacuo. This resulting anil (an oil) is added to 400 ml. of dodecyl benzene at 250° C. The mixture is stirred and heated at 245–250° C. for 30 minutes, and then allowed to cool to room temperature. A dark gum separates. The mother liquor is decanted and the gum rubbed with ether. The ether is decanted and the gum extracted with warm acetone, this causing the gum to crystallize. The crystals are collected (M.P. 247° C., dec), washed with hot ethanol and then recrystallized from dimethylformamide to give substantially pure methyl 6,7-bis-diethylamino-4-hydroxy quinoline-3-carboxylate, M.P. 251° C. (dec.).

When the above reaction is repeated using N,N-dimethyl-2-diethylamino-5-nitroaniline or N,N-dibutyl-2-diethylamino-5-nitroaniline, there is obtained methyl 4-hydroxy-6-diethylamino-7-dimethylamino-quinoline- 3-carboxylate and methyl 4-hydroxy-6-diethylamino-7-dibutylamino-quinoline-3-carboxylate, respectively.

The ethyl esters of these 4-hydroxy-6,7-dialkylamino-quinoline-3-carboxylates are produced in like manner using diethyl methoxymethylene malonate in the foregoing process instead of the dimethyl malonate.

Example 14.—Methyl 6-dimethylamino-7-diethylamino-4-hydroxy-quinoline-3-carboxylate A solution of 11.9 g. of 1-diethylamino-2-dimethylamino-5-nitrobenzene is hydrogenated in 150 ml. of methanol using 1 teaspoonful of Raney nickel catalyst. When hydrogen absorption ceases, the catalyst is removed by filtration and the methanol solution mixed directly with 8.5 g. of dimethyl methoxymethylene malonate in 50 ml. of toluene. The mixture is heated on a steam bath for 30 minutes and then evaporated to an oil in vacuo, the oil consisting essentially of the anil of the two reactants. This product is then added to 200 ml. of dodecyl benzene at 255° C. and maintained at that tempearture for 25 minutes. The reaction mass is cooled to room temperature and the solid methyl 6-dimethylamino-7-diethylamino-4-hydroxy-quinoline-3-carboxylate recovered by filtration. It is recrystallized from dimethylformamide to afford substantially pure material, M.P. 253° C.

Example 15.—Ethyl 6,7-bis-diethylamino-4-hydroxy-quinoline-3-carboxylate

When the procedure of Example 14 is repeated using as starting material 13.3 g. of 1,2-bis-diethylamino-4-nitrobenzene, carrying out the Raney nickel reduction in ethanol, and using 13 g. of diethyl ethoxymethylene malonate, there is obtained ethyl 6,7-bis-diethylamino-4-hydroxyquinoline-3-carboxylate, M.P. 264–265° C.

Example 16.—3-carbomethoxy-4-hydroxy-6-n-propyl-7-quinolyl diethylmethyl ammonium iodide To 2.5 g. of methyl 6-n-propyl-7-diethylamino-4-hydroxy-quinoline-3-carboxylate is added 15 ml. of methanol and 25 ml. of methyl iodide. The resulting solution is heated under reflux for 5 days. The solvents are then removed in vacuo and the residue crystallized from acetonitrile to give 1.05 g. of 3-carbomethoxy-4-hydroxy-6-n-propyl-7-quinolyl diethylmethyl ammonium iodide. Recrystallization from acetonitrile affords substantially pure material, M.P. 126–127° C.

Example 17.—Methyl 6-n-propyl-7-diethylamino-4-hydroxy-quinoline-3-carboxylate

To a suspension of 0.6 g. of 6-n-propyl-7-diethylamino-4-hydroxy-quinoline-3-carboxylic acid in 20 ml. of methanol there is added 1.5 ml. of concentrated sulfuric acid. The resulting mixture is heated on a steam bath for 15 hours and most of the alcohol then removed by concentration in vacuo. The residue is cooled, neutralized with 10% sodium carbonate and the resulting precipitate separated and crystallized from dimethyl formamide to give substantially pure methyl 6-n-propyl-7-diethylamino-4-hydroxy-quinoline-3-carboxylate.

1 g. of 6-n-propyl - 7 - diethylamino-4-hydroxy-quinoline-3-carboxylic acid is refluxed in benzene for 7 hours with a molar equivalent of thionyl chloride. The resulting acid chloride is separated and refluxed for 5 hours in 40 ml. of methanol. The reaction mixture is then filtered, the filtrate chilled and the solid product separated. It is recrystallized from dimethyl formamide to give methyl 6-n-propyl-7-diethylamino - 4 - hydroxy-quinoline-3-carboxylate.

The starting material for preparing the loweralkyl-6-loweralkyl-7-dialkylamino-4-hydroxy-quinoline - 3 - carboxylates of this invention are 3-dialkylamino-4-loweralkyl aniline (alternatively named as 2-loweralkyl-5-amino-N,N-dialkylanilines) of the formula

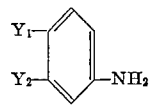

where $Y_1$ is loweralkyl and $Y_2$ is diloweralkylamino. Such materials are obtained on catalytic hydrogenation of the corresponding nitro compounds using a palladium or Raney nickel catalyst. Those nitro compounds which are not specifically described in the literature may be prepared by the procedures stated below for making the starting compounds of Examples 1–7 above.

(A) A solution of 54 ml. (77 g.) of nitric acid (d. 1.42) in 75 ml. (138 g.) of sulfuric acid (d. 1.84) is added dropwise with vigorous stirring to 100 g. of n-propylbenzene over a period of about 2 hours. During the addition, the temperature is kept at 25–30° C. with external cooling. After the addition is complete, the mixture is stirred for an additional 2 hours at 25–30° C. and then for 1 hour at 40° C. The mixture is then poured onto chopped ice with stirring and extracted with 3 × 75 ml. of hexane. The hexane extracts are combined, washed successively with 50 ml. portions of water, aqueous sodium bicarbonate, and finally with water again. The hexane solution is dried over magnesium sulfate, filtered and the hexane removed under reduced pressure. The residual oil is distilled under reduced pressure using a spinning band fractionating column. The desired o-isomer is the lowest boiling isomer. It boils at 118° C./15 mm., and this fraction of the distillate is collected to give 2-nitro-n-propylbenzene.

Other 2-nitro-alkylbenzenes are prepared in the same manner by nitration of the appropriate alkyl benzene. Representative examples have the following constants: 2-nitro-isobutylbenzene, B.P. 124° C./15 mm.; 2-nitro-s-butylbenzene, B.P. 122° C./13 mm; 2-nitro-n-butylbenzene, B.P. 132° C./14 mm.; 2-nitro-isopropylbenzene, B.P. 115° C./15 mm.

(B) 2-n-propyl-N,N-diethylaniline.—79 g. of 2-nitro-n-propylbenzene in 600 ml. of absolute ethanol and 64 ml. of acetaldehyde is hydrogenated in the presence of 5 g. of 5% palladium-on-carbon catalyst at room temperature and under about 40 p.s.i. hydrogen pressure. After the hydrogen absorption ceases (an amount greater than theory is absorbed due to the excess acetaldehyde present) the catalyst is removed by filtration and the alcohol removed under reduced pressure. The residue is distilled under reduced pressure to afford 2-n-propyl-N,N-diethyl-aniline, B.P. 127–133° C./28 mm.

Other 2-alkyl-N,N-diethylanilines are prepared in the same way and have the indicated properties: 2-isobutyl-N,N-diethylaniline, B.P. 124–127° C./25 mm.; 2-sec-butyl-N,N-diethylaniline, B.P. 129° C./25 mm.; 2-n-butyl-N,N-diethylaniline, B.P. 143° C./29 mm.; 2-isopropyl-N,N-diethylaniline, B.P. 126° C./28 mm. Use of formaldehyde or propionaldehyde in place of acetaldehyde affords the corresponding N,N-dimethyl or N,N-dipropyl aniline.

A different procedure is the following, as applied to making 2-ethyl-N,N-diethylaniline:

A mixture of 100 g. of 2-ethylaniline and 150 g. of triethylphosphate is stirred and heated to about 160° C. When the exothermic reaction subsides, the mixture is stirred and heated at 200° C. for 4 hours. The mixture is cooled and to it is carefully added a solution of 100 g. of sodium hydroxide in 500 ml. of water. The mixture is stirred at room temperature for 12 hours. The precipitated oil is extracted into ether. The ether extracts are then dried, evaporated to dryness and the residue distilled at atmospheric pressure. The fraction distilling at 220° C. is 2-ethyl-N,N-diethylaniline.

(C) 74 g. of 2-n-propyl-N,N-diethylaniline is added, with stirring and cooling, to 400 ml. of sulfuric acid (d. 1.48). The temperature during the above addition is held below 20° C. The solution is then cooled to 0° C. and a solution of 20 ml. of nitric acid (d. 1.42) in 60 ml.

of sulfuric acid (d. 1.84) is added dropwise, keeping the temperature at 0° to 5° C. After the addition is complete the mixture is stirred at 5° C. for an additional 30 minutes and then poured onto ice. The mixture is neutralized by the addition of solid sodium carbonate. Small amounts of ether are added during the addition to keep the foaming under control. After neutralization the mixture is brought to room temperature (to dissolve the hydrated sodium sulfate) and extracted with 3×100 ml. of ether. The ether extracts are combined, washed with water, dried over magnesium sulfate, filtered and concentrated to dryness. The residue is distilled under reduced pressure to give 2-n-propyl-5-nitro-N,N-diethyl-aniline, B.P. 134° C./1.8 mm.

Other 2-alkyl-5-nitro-N,N-diloweralkylanilines are prepared in the same way from the appropriate starting material, representative examples being: 2-isobutyl-5-nitro-N,N.-diethylaniline, B.P. 134–135° C./0.75–1.0 mm.; 2-sec-butyl-5-nitro-N,N-diethylaniline, B.P. 135° C./1.3 mm.; 2-n-butyl-5-nitro-N,N-diethylaniline, B.P. 143° C./1.65 mm.; 2-isopropyl-5-nitro-N,N-diethylaniline, B.P. 124° C./1.45 mm.; and 2-ethyl-5-nitro-N,N-diethylaniline, B.P. 126° C./0.5 mm.

The starting compounds for preparing the loweralkyl 6-dialkylamino-7-loweralkyl-4-hydroxy-quinoline - 3 - carboxylates of this invention (Examples 8–11) are 3-loweralkyl-4-diloweralkylamino anilines of the formula

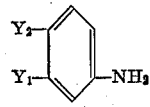

where $Y_1$ is loweralkyl and $Y_2$ is diloweralkylamino. They are obtained from the appropriate o-nitroalkylbenzene by (a) reacting said substance with hydrogen and an aldehyde at superatmospheric pressure in a loweralkanol to produce 2-loweralkyl-N,N-diloweralkylaniline; (b) coupling said substance with the diazo salt of 2,5-dichloro-aniline to produce 3-loweralkyl-4-diloweralkylamino-2',5'-dichloroazobenzene; and (c) decomposing the azo-benzene with aluminum in ethanolic hydrogen chloride. Details of a representative preparation follow.

(D) A solution of 54 g. of 2-nitropropyl benzene in 500 ml. of methanol and 80 ml. of 37% formaldehyde is hydrogenated at room temperature at 40 p.s.i. using 2 g. of 5% palladium-on-charcoal as the catalyst until hydrogen uptake ceases. The catalyst is removed by filtration, and the filtrate evaporated to dryness. The residue is distilled in vacuo to give 2-n-propyl-N,N-dimethyl-aniline. The corresponding N,N-diethylaniline and N,N-dipropylaniline are obtained by using acetaldehyde or propionaldehyde in place of formaldehyde.

(E) A solution composed of 16.2 g. of 2,5-dichloro aniline in 40 ml. of concentrated hydrochloric acid and 120 ml. of water is diazotized at 0° C. using a solution of 7 g. of sodium nitrite in 30 ml. of water. To this solution, at 0° C., there is added a solution of 19.1 g. of 2-n-propyl-N,N-diethylaniline in 10 ml. of concentrated hydrochloric acid and 50 ml. of water. The solution is held at 0° C. and solid potassium acetate added until the solution is acidic to litmus but not to congo red paper. The mixture is then allowed to warm to room temperature and stirred for 14 hours. It is then extracted with 3×80 ml. of ether. The ether extracts are combined, washed with water, sodium bicarbonate solution, again with water, and then dried. The ether solution is evaporated to dryness to give 8 g. of an oil. This oil is placed on an alumina column and washed through with hexane. The hexane is evaporated to give 5 g. of 3-n-propyl-4-diethylamino-2',5'-dichloro azobenzene.

3-n-propyl-4-dimethylamino-2',5'-dichloro azobenzene, 3-n-butyl-4-diethylamino-2',5'-dichloro azobenzene and other 3 - loweralkyl-4-diloweralkylamino-2',5'-dichloro azobenzenes are obtained in like fashion.

(F) A total of 13 g. of 3-n-propyl-4-diethylamino-2',5'-dichloro azobenzene is dissolved in 30 ml. of ethanol, 40 ml. of concentrated hydrochloric acid and 40 ml. of water. The mixture is stirred vigorously at 60–65° C. and aluminum powder is cautiously added. Cooling is necessary to hold the temperature below 75° C. When the color of the solution changes from red to a greyish color, no more aluminum powder is added but 10 ml. of concentrated hydrochloric acid is added and the mixture stirred for two hours. This mixture is then steam distilled. About 1200 ml. of distillate is collected and then the residue is made basic with 50% sodium hydroxide. It is then steam distilled again. The first 800 ml. of distillate is collected, and extracted with 3×300 ml. of ether. The ether extracts are combined and concentrated to dryness to give 5.7 g. of 3-n-propyl-4-diethylamino-aniline.

Other starting materials such as 3-n-propyl-4-dimethyl-amino-aniline and 3-n-butyl-4-diethylamino aniline are obtained in like manner from the appropriate azobenzene.

The starting compounds for making the loweralkyl 6,7-bis-diloweralkylamino-4-hydroxy-quinoline - 3 - carboxylates of the invention are 3,4-bis-diloweralkylamino anilines, the preferred synthesis of which depends upon the particular diloweralkylamino radical. 3,4-bis-dimethylamino aniline is prepared by catalytic hydrogenation of 3,4-bis-dimethylamino-nitrobenzene in methanol over palladium-on-charcoal catalyst.

In order to obtain such 3,4-disubstituted anilines where one or both of the dialkylamino substituents are other than dimethylamino, the following preparative method is preferred; 2-fluoroaniline is reacted with a triloweralkyl phosphate to give 2-fluoro-N,N-diloweralkylaniline; this material is nitrated with nitric acid-sulfuric acid to form 3-dialkylamino-4-fluoro-nitrobenzene, which substance is then treated with a diloweralkylamine in aqueous alcohol to yield 3,4-bis-dialkylamino-nitrobenzene, where the two dialkylamino radicals may be the same or different; this nitrobenzene is catalytically hydrogenated with palladium catalyst to give 3,4-diloweralkylamino aniline. Details are as follows:

(G) A mixture of 100 g. of 2-fluoroaniline and 150 g. of triethylphosphate is stirred and heated to about 160° C. where there is a slight exothermic reaction. When this subsides heating is applied again and there is another exotherm at about 180° C. The mixture is then heated at 203° C. (internal temperature) for 4 hours. The mixture is cooled to room temperature and a solution of 100 g. of sodium hydroxide in 400 ml. of water is added in portions with stirring. The mixture is stirred for 12 hours. Another 500 ml. of water is then added and the resulting oil extracted with 3× 100 ml. of ether. The combined ether extracts are washed once with water, dried, and evaporated to dryness. The residue is distilled at atmospheric pressure, and 2-fluoro-N,N-diethyl aniline distills as a colorless oil at 198° C. When this experiment is repeated using trimethyl phosphate or tributyl phosphate, there is obtained 2-fluoro-N,N-dimethyl aniline and 2-fluoro-N,N-dibutyl aniline, respectively.

(H) To a solution of 60 g. of 2-fluoro-N,N-diethyl aniline in 500 ml. of concentrated sulfuric acid, cooled to about 18° C., there is added a solution of 24.6 g. (16.2 ml.) of fuming nitric acid in 150 ml. of concentrated sulfuric acid over 1 hour, keeping the temperature below 19° C. The solution is then held at room temperature for 2 hours, then poured onto ice. The solution is neutralized with ammonium hydroxide with cooling. An oil precipitates which is extracted with 3× 200 ml. of ether and the combined ether extracts are washed with 3× 150 ml. of water, the ether solution dried and then evaporated to dryness. The residue is distilled at about 0.5 mm./Hg. A small forerun of 1.5 g. boiling at 65–80° C. is discarded. The second and main fraction distills at 98° C. as an orange oil. It is substantially pure 3-diethylamino-4-fluoro-nitrobenzene.

3-dimethylamino - 4 - fluoro - nitrobenzene and 3- dibutylamino-4-fluoro-nitrobenzene are obtained in a similar fashion from the corresponding 2-fluoro-N,N-dialkyl aniline.

(I) A mixture of 21.2 g. of 3-diethylamino-4-fluoro-nitrobenzene, 60 g. of diethylamine and 50 ml. of 50% ethanol is heated in a bomb at 155° C. for 11 hours. Most of the solvent and excess diethylamine is removed in vacuo. The residue is taken up in 50 ml. of 1:1 water-ether. The ether layer is separated, washed twice with water, dried and then evaporated to a red oil. This oil is distilled at about 0.5 mm./Hg. 3,4-bis-diethylamino-nitrobenzene distills as a red oil at 140–142° C./0.5 mm.

When 3 - dimethylamino - 4 - fluoro-nitrobenzene or 3-dibutylamino-4-fluoro-nitrobenzene are treated with diethylamine by the above procedure there is obtained 3-dimethylamino - 4 - diethylamino-nitrobenzene and 3-dibutylamino-4-diethylamino-nitrobenzene, respectively.

Alternatively, the compounds may be made from 2-chloroaniline, as follows:

(J) A mixture of 60 g. of 2-chloroaniline and 90 g. of triethyl phosphate is stirred and heated to 200° C. for 3.5 hours. The mixture is cooled to room temperature and a solution of 65 g. of sodium hydroxide in 300 ml. of water added. After stirring for 2 hours the precipitated oil is extracted with ether. The ether extracts are dried, evaporated to dryness, and the residue distilled at 15 mm. 2-chloro-N,N-diethylaniline distills at 92–94° C.

(K) A solution of 4.5 g. of fuming nitric acid in 15 ml. of concentrated sulfuric acid is added over 20 minutes to 10 g. of 2-chloro-N,N-diethylaniline in 50 ml. of concentrated sulfuric acid keeping the temperature between 15 to 20° C. The solution is then poured onto ice and neutralized with concentrated ammonium hydroxide. The oil is extracted with ether, the ether extract washed with water, dried, then evaporated to dryness. The residue is distilled at 1 mm.; 3-diethylamino-4-chloro-nitrobenzene, distils at 120–123° C.

A mixture of 8 g. of 3-diethylamino-4-chloronitrobenzene, 55 ml. of 40% aqueous dimethylamine, and 10 ml. of ethanol is heated in a bomb at 165° C. for 12 hours. The reaction mixture is concentrated in vacuo and the residue was taken up between ether and water. The ether is separated, washed with water, dried, then evaporated to dryness in vacuo. The residue is dissolved in a little petroleum ether then cooled in a dry ace-acetone. 3-diethylamino - 4 - dimethylamino-nitrobenzene crystallizes, M.P. 48–50° C.

What is claimed is:

1. A composition for the control of coccidiosis in poultry that comprises an inert edible carrier having intimately dispersed therein from 1% to about 40% by weight of a quinolate of the formula

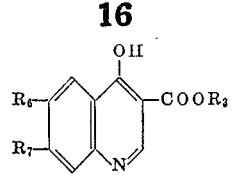

where $R_3$ is loweralkyl; $R_6$ and $R_7$ each are loweralkyl of 2–4 carbon atoms of diloweralkylamino, at least one of $R_6$ and $R_7$ being diloweralkylamino.

2. The composition of claim 1 wherein the carrier is a solid poultry feed additive and contains from about 2–25% by weight of quinolate.

3. The composition of claim 2 wherein $R_3$ is methyl or ethyl; $R_6$ is loweralkyl of 2–4 carbons; and $R_7$ is diloweralkylamino.

4. The composition of claim 2 wherein the quinolate is methyl - 6 - n - propyl - 7 - diethylamino - 4 - hydroxy-quinoline-3-carboxylate.

5. A composition useful in the control of coccidiosis that comprise a poultry feed containing a minor but anticoccidially effective amount of a quinolate having the formula

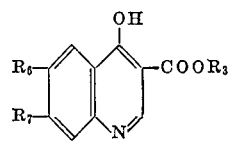

where $R_3$ is loweralkyl; $R_6$ and $R_7$ each are loweralkyl of 2–4 carbon atoms or diloweralkylamino, at least one of $R_6$ and $R_7$ being diloweralkylamino.

6. The composition of claim 5 wherein the poultry feed contains from about 0.0005% to about 0.05% by weight of quinolate.

7. The composition of claim 5 wherein the poultry feed contains from about 0.00075% to about 0.0125% by weight of quinolate.

8. The composition of claim 6 wherein $R_3$ is methyl or ethyl; $R_6$ is loweralkyl of 2–4 carbon atoms; and $R_7$ is diloweralkylamino.

9. The composition of claim 7 wherein the quinolate is methyl-6-n-propyl-7-diethylamino-4-hydroxy-quinoline-3-carboxylate.

References Cited
UNITED STATES PATENTS

| | | | |
|---|---|---|---|
| 2,419,199 | 4/1947 | Burckhalter et al. | 260—288 |
| 2,614,121 | 10/1952 | Price et al. | 260—171 |
| 3,267,106 | 8/1966 | Watson | 260—287 |
| 3,316,147 | 4/1967 | Watson | 167—53.1 |
| 3,351,525 | 11/1967 | Hodel | 167—53.1 |

ALBERT T. MEYERS, Primary Examiner

H. M. ELLIS, Assistant Examiner

UNITED STATES PATENT OFFICE
CERTIFICATE OF CORRECTION

Patent No. 3,474,169    October 21, 1969

Robert L. Clark et al.

It is certified that error appears in the above identified patent and that said Letters Patent are hereby corrected as shown below:

Column 16, line 17, "diethylamina" should read -- diethylamino --.

Signed and sealed this 6th day of January 1970.

(SEAL)
Attest:

Edward M. Fletcher, Jr.
Attesting Officer

WILLIAM E. SCHUYLER, JR.
Commissioner of Patents